(12) United States Patent
Monterosso et al.

(10) Patent No.: US 10,131,101 B2
(45) Date of Patent: Nov. 20, 2018

(54) METHOD AND APPARATUS FOR CONTINUOUSLY PRODUCING A SEMI-FINISHED PRODUCT FOR THE PRODUCTION OF SELF-SEALING TYRES

(71) Applicant: PIRELLI TYRE S.P.A, Milan (IT)

(72) Inventors: Antonio Monterosso, Milan (IT); Alberto Scurati, Milan (IT); Stefano Testi, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 227 days.

(21) Appl. No.: 15/039,377

(22) PCT Filed: Nov. 21, 2014

(86) PCT No.: PCT/IB2014/066228
§ 371 (c)(1),
(2) Date: May 25, 2016

(87) PCT Pub. No.: WO2015/092574
PCT Pub. Date: Jun. 25, 2015

(65) Prior Publication Data
US 2017/0157868 A1    Jun. 8, 2017

(30) Foreign Application Priority Data
Dec. 20, 2013    (IT) .......................... MI2013A002145

(51) Int. Cl.
*B29C 73/16*    (2006.01)
*B29D 30/06*    (2006.01)
(Continued)

(52) U.S. Cl.
CPC .............. *B29C 73/163* (2013.01); *B29B 7/30* (2013.01); *B29C 47/0064* (2013.01);
(Continued)

(58) Field of Classification Search
CPC ... B29C 73/163; B29C 47/367; B29C 47/884; B29C 47/0064; B29B 7/30;
(Continued)

(56) References Cited

U.S. PATENT DOCUMENTS 5,539,033 A * 7/1996 Bredahl .............. B29C 47/0047
523/318
8,226,868 B2    7/2012 Abad et al.
(Continued)

FOREIGN PATENT DOCUMENTS

EP    0668819 B1    8/1998
GB    793525    11/1955
(Continued)

OTHER PUBLICATIONS

International Search Report issued for International Application No. PCT/IB2014/066228 filed on Nov. 21, 2014 in the name of Pirelli Tyre S.P.A. dated May 3, 2015.
(Continued)

*Primary Examiner* — Vishal I Patel
(74) *Attorney, Agent, or Firm* — Steinfl + Bruno LLP

(57) ABSTRACT

An apparatus, and relative method, for producing a semi-finished product with a strip of sealing compound for building tires, having at least one unsaturated styrene thermoplastic elastomer, one bonding resin and one cross-linking agent are described.

9 Claims, 5 Drawing Sheets

(51) Int. Cl.
  *B29C 47/36* (2006.01)
  *B29B 7/30* (2006.01)
  *B29C 47/00* (2006.01)
  *B29C 47/88* (2006.01)
  *B29K 19/00* (2006.01)
  *B29K 25/00* (2006.01)
  *B29L 30/00* (2006.01)

(52) U.S. Cl.
  CPC .......... *B29C 47/367* (2013.01); *B29C 47/884* (2013.01); *B29D 30/0685* (2013.01); *B29C 47/0019* (2013.01); *B29C 47/366* (2013.01); *B29D 2030/0695* (2013.01); *B29K 2019/00* (2013.01); *B29K 2025/04* (2013.01); *B29L 2030/00* (2013.01)

(58) Field of Classification Search
  CPC ........ B29D 30/0685; B29D 2030/0695; B29K 2025/04; B29L 2030/00
  See application file for complete search history.

(56) References Cited

U.S. PATENT DOCUMENTS

| | | |
|---|---|---|
| 2005/0228076 A1 | 10/2005 | Maris |
| 2009/0272476 A1 | 11/2009 | Wilson |
| 2011/0198009 A1 | 8/2011 | Merino-Lopez et al. |
| 2011/0213050 A1 | 9/2011 | Pialot et al. |
| 2011/0272476 A1 | 11/2011 | Mullen et al. |
| 2012/0241067 A1 | 9/2012 | D'Oria et al. |

FOREIGN PATENT DOCUMENTS

| | | |
|---|---|---|
| WO | 94/11175 | 5/1994 |
| WO | 2011/064698 | 6/2011 |

OTHER PUBLICATIONS

Written Opinion issued for International Application No. PCT/IB2014/066228 filed on Nov. 21, 2014 in the name of Pirelli Tyre S.P.A. dated Oct. 1, 2014.

\* cited by examiner

METHOD AND APPARATUS FOR CONTINUOUSLY PRODUCING A SEMI-FINISHED PRODUCT FOR THE PRODUCTION OF SELF-SEALING TYRES

CROSS REFERENCE TO RELATED APPLICATIONS

The present application is the U.S. national stage entry of International Patent Application No. PCT/IB2014/066228, filed internationally on Nov. 21, 2014 which, in turn, claims priority to Italian Patent Application No. MI2013A002145, filed on Dec. 20, 2013.

The present invention relates to a method and an apparatus for the continuous production of a semi-finished product for producing self-sealing tyres, in particular a semi-finished product comprising a strip of sealing compound.

The present invention also relates to a process and a plant for producing self-sealing tyres.

In the field of tyres for vehicle wheels, the self-sealing tyres have been known for decades, e.g. described in GB739525 is a self-sealing tyre which, according to that claimed, would be able to prevent the loss of air and consequent deflation due to a puncture caused by a nail or another pointed object.

Typically a self-sealing tyre comprises at least one layer of sealing compound (typically in proximity of the radially inner surface thereof) which can adhere to the object inserted therein and can also flow into the hole when such object is removed, thus sealing the hole itself, preventing or slowing the outflow of the air from the tyre. Such compound must be deformable and sticky during the operation of the tyre but it must possess, in particular during the obtainment of the tyre, a sufficiently rigid structure adapted to allow it to maintain its form.

Methods and apparatuses for preparing and shaping sealing compounds are for example known from the following documents.

Described in the patent document US 2009/0272476 is a method for preparing a non-polymerised sealing composition where the various components are mixed by using an inner mixer for rubber.

Described in the patent document US 2011/0213050 is a process for producing a self-sealing elastomeric composition wherein a masterbatch is produced comprising an elastomer and a thermoplastic resin by means of their mixing in a mixer (e.g. a compounding screw extruder) and subsequently a cross-linking system is introduced into the masterbatch, by mixing everything in the same or in a different mixer (e.g. an external mixer of the two-roll open mill type).

Described in the patent document US 2005/0228076 is a method for continuously producing a composition comprising rubber, resin and solvent by using a co-rotating twin-screw extruder.

Described in the patent document US 2011/0198009 is a tyre provided with a layer that is resistant to punctures due to a self-sealing composition. As an example, the ingredients of the composition are mixed by means of a twin-screw extruder at a temperature of about 190° C. The extruder is provided with an extrusion head for the extrusion of the product with the desired size.

Described in the patent document U.S. Pat. No. 8,226,868 is a device for producing a flat element profiled from a thermoplastic elastomeric gel that includes an extruder (e.g. co-rotating twin-screw extruder), an extruder die and a cooling liquid bath.

Typically, for producing a self-sealing tyre, a semi-finished product can be used comprising a continuous strip of sealing compound, typically supported by at least one support layer of the sealing compound in order to allow the handling thereof (e.g. the winding on a drum via depositing, the transport, the deposition during building, etc). An example of one such semi-finished product is described in the application WO2011/064698A1 on behalf of the Applicant.

SUMMARY OF THE INVENTION

Until recently, the market demand for self-sealing tyres was low in volume and hence the production of the sealing compound and/or of the relative semi-finished product did not have to meet the requirements typical of industrial mass production, such as high volumes, low production times, low costs, high automation, etc. The production of the sealing compound and/or of the relative semi-finished product has up to now been executed with artisanal or quasi-artisanal methods, comprising different production steps (mixing, shaping, etc) that are not continuous with each other (e.g. spaced by steps for unloading/loading the semi-finished or finished compound from the/into the processing machines, such as mixers or extruders).

The Applicant has recently verified that the volumes of self-sealing tyres requested by the market have considerably increased, and therefore the Applicant deems desirable a method for producing the semi-finished products comprising a continuous strip of sealing compound suitable for the production of high volumes with limited costs (e.g. which requires a overall brief processing time and/or that it is highly automated).

The Applicant has also perceived that the performances of the sealing compound layer inside the tyre can depend on the thickness of the layer, and also on the uniformity of the thickness along the directrix that follows the circumferential extension of the tyre.

In such context, the Applicant has therefore set the problem of achieving a method and an apparatus for producing a semi-finished product comprising a continuous strip of sealing compound for the production of self-sealing tyres, suitable for an industrial mass production with limited costs which at the same time ensure high longitudinal uniformity of the transverse size (e.g. height and width) of the strip.

According to the Applicant, the known methods for producing a semi-finished product comprising a continuous strip of sealing compound, carried out in different steps, due to their complexity and/or length of execution times are not suitable for an industrial production that requires high volumes, brief processing times and/or low costs, and/or they do not ensure a precise control of the longitudinal uniformity of the transverse size.

In a first aspect, the invention relates to an apparatus for producing a semi-finished product comprising a strip of sealing compound for building tyres.

By 'semi-finished product' it is intended an element constituting the green tyre having the profile on the orthogonal section and the transverse size provided for its incorporation in the green tyre.

By 'strip' it is intended a continuous elongated element having the longitudinal size much greater (e.g. two or more orders of magnitude) than the transverse size.

By 'sealing compound' it is intended a finished compound, i.e. complete with all the components dispersed together, and ready for the incorporation in the green tyre, in a manner so as to confer, during the operation of the finished tyre, the sealing characteristics desired for the application of the present invention. For example, the sealing compound in the finished tyre has viscoelastic characteristics such that it can flow inside a perforation produced by a sharp-pointed element on the carcass structure and a stickiness such to generate the drag force that is exerted thereon via contact with the moving sharp-pointed element (e.g. when the sharp-pointed element is expelled during the rolling of the tyre).

The sealing compound can for example comprise:
(a) at least one unsaturated styrene thermoplastic elastomer;
(b) at least one bonding resin;
(c) at least one cross-linking agent;
(d) optionally at least one diene elastomer.

Optionally the sealing material can also comprise e) at least one plasticising agent and f) at least one reinforcement filler, g) at least one peptising agent.

The production apparatus comprises a continuous mixer structured for receiving the components of the sealing compound (separately distinct from each other and/or already blended together, even partially and/or in subgroups) and to continuously mix them until the sealing compound is obtained.

With the term 'continuous mixer', it is intended to indicate a mixing device adapted to receive the components of an elastomeric compound that are continuously fed (except during a possible stop of the mixing device for maintenance, or modification of the elastomeric compound formula), typically by means of controlled dosage meters, and to subject them to mixing in a manner such to obtain (possibly in multiple mixing steps) the finished elastomeric compound, and adapted to unload the elastomeric compound in a continuous flow, in contrast with the periodic loading/unloading of a discontinuous mixing device (such as a Banbury™ etc). In the jargon of the field of mixers for elastomeric compounds, the continuous mixer is sometimes indicated with the term 'mixing extruder', which is considered herein to be equivalent to 'continuous mixer', even if in the preferred embodiments of the present invention the continuous mixer does not execute, during use, an actual 'extrusion' of the finished compound (but rather a delivery of the finished compound to the buffer device).

The continuous mixer comprises at least one (substantially cylindrical) inner chamber within which a worm screw, or a plurality of screws, or blades in the case of planetary mixers, typically rotates. The mixing of the material occurs during its travel along the major extension direction of the inner chamber.

The main function of the continuous mixer is to process the elastomeric material by increasing the temperature in a manner so as to make it soft and plastic, in order to facilitate the incorporation and/or the distribution of the ingredients within the polymer matrix. The continuous mixer is therefore mainly provided with mixing portions capable of conferring high shear stress to the compound, and with possible redistribution portions. The continuous mixer is also provided with conveyor portions capable of conveying the compound being processed from one longitudinal end to the other of the inner chamber.

The apparatus comprises, downstream of the continuous mixer, a buffer device and, downstream of the buffer device, a gear pump, both provided with a respective inner chamber.

The buffer device is arranged and structured for receiving the sealing compound from the continuous mixer and for feeding the gear pump.

The expressions 'upstream', 'downstream', 'terminal', 'longitudinal', etc., are used with reference to the direction of flow of the sealing compound being processed in the apparatus.

The buffer device is preferably coupled in series, with structural continuity, to the continuous mixer in a manner such that the two respective inner chambers are physically connected without interruption (e.g. substantially without outlet to the outside environment).

Examples of buffer devices can include a single-screw extruder, a twin-screw extruder (TSE) etc.

By 'single-screw extruder' it is intended a device comprising a single conveyor screw housed in the respective inner chamber, where the conveyor screw (typically with helical conformation) is configured for conveying the sealing compound along the major extension direction of the inner chamber, exerting thereon a substantially zero or very low mixing. It is observed that, notwithstanding the term 'extruder', in the present invention the compound is not unloaded to the outside by extrusion at the terminal end downstream of the single-screw extruder.

The gear pump has a gear system housed in the respective inner chamber, and is coupled with structural continuity to the buffer device downstream of the latter, in a manner such that the two respective inner chambers are physically connected without interruption.

The apparatus also comprises an extrusion head coupled directly and with structural continuity to the gear pump, downstream of the latter, in a manner such to receive in input the sealing compound from the gear pump and deliver in output the sealing compound in the form of said strip with predetermined transverse size.

In a second aspect, the invention relates to a method for producing a semi-finished product (e.g. having the characteristics described herein) comprising a strip of said sealing compound for building tyres.

The method comprises feeding the components of the sealing compound (separately distinct from each other and/or already blended together, even partially and/or in subgroups) in a continuous mixer (having the above-described characteristics), and mixing the components while they advance in the continuous mixer until the sealing compound is obtained.

The method subsequently comprises continuously feeding the sealing compound from the continuous mixer directly to a buffer device (e.g. having the above-described characteristics) coupled in series with structural continuity to the continuous mixer, downstream of the latter, in a manner such that the two respective inner chambers are physically connected without interruption.

The method subsequently comprises advancing the sealing compound in the buffer device in a manner so as to continuously feed the sealing compound to a gear pump (e.g. having the aforesaid characteristics) having a respective inner chamber and a gear system housed in the respective inner chamber, and coupled with structural continuity to the buffer device downstream of the latter, in a manner such that the two respective inner chambers are physically connected without interruption. The method subsequently comprises continuously feeding, by means of the gear pump, the sealing compound to an extrusion head (e.g. having the aforesaid characteristics) coupled directly and with structural continuity to an outlet of the gear pump, in a manner so as to obtain, in output from said extrusion head, said sealing compound strip with predetermined transverse size.

According to the Applicant, the apparatus and the method of the present invention allow continuously producing a semi-finished product containing a continuous strip of sealing compound having excellent longitudinal uniformity of the transverse size, with a single continuous production process comprising the mixing of the raw components and the shaping of the strip, thus being advantageously adapted for a use thereof in an industrial production of tyres, characterised by a request of high volumes of the semi-finished product, low execution times (and generally low costs) and high uniformity.

The Applicant has assumed that the production of a semi-finished product comprising the sealing compound strip by means of the linking in series of a continuous mixer, a buffer device, a gear pump and an extrusion head, physically connected to each other with structural continuity, without interruption between the respective inner chambers, would allow effectively decoupling the operations of mixing the raw components of the sealing compound from the operations of shaping the continuous strip. Before reaching the present solution, the Applicant tried to produce the continuous strip of sealing compound in a single continuous process comprising the mixing and the shaping, with a first comparative arrangement in which an extrusion head is coupled directly, with structural continuity, to the outlet of a continuous twin-screw mixer. The obtained result was not satisfactory in terms of size stability of the extruded strip. Consequently, the Applicant tried a second comparative arrangement in which the extrusion head is coupled directly, with structural continuity, to a gear pump which is in turn coupled directly, with structural continuity, to the outlet of a continuous twin-screw mixer. The obtained result, even if improved with respect to the first comparative arrangement, was not yet satisfactory in terms of longitudinal uniformity of the transverse size of the extruded strip.

The Applicant then fine-tuned the solution according to the present invention, wherein as an addition to the second comparative arrangement, a buffer device (e.g. a single-screw extruder) is interposed with structural continuity between the continuous mixer (e.g. a twin-screw mixer), and the gear pump, unexpectedly obtaining a strip with excellent longitudinal size uniformity.

In addition, the Applicant has empirically observed that the temperature exiting from the extrusion head in the solution of the present invention is lower, given the same flow rate, with respect to the first and second comparative arrangement, cancelling or considerably limiting the risk of scorching the compound. In addition, notwithstanding the further processing carried out by the buffer device on the sealing compound, the greater thermal control and relaxation time of the sealing compound introduced by the buffer device allowed the Applicant to obtain a sealing compound that was more manageable in terms of size stability and reduction of the internal tensions, such to allow a correct feeding of the forming apparatus (gear pump+extrusion head) for the semi-finished product downstream of the apparatus.

Without wishing to be tied to an interpretation theory, according to the Applicant in the first and second comparative arrangement, the two operations of continuous mixing and shaping are closely correlated, affecting and disturbing each other. For example, it is deemed that in the first and second comparative arrangement the pressure/flow rate pulses imparted to the sealing compound by the continuous metering system and/or the continuous mixer are reflected in the extrusion head, giving rise to a longitudinal non-uniformity of the transverse size. In such situation, it is difficult to simultaneously optimise the mixing and shaping. In the present solution, however, the aforesaid decoupling limits or cancels the effects of one operation on the other, which can therefore be performed in optimal conditions that are more easily identifiable and obtainable. For example, the aforesaid pulses can be absorbed (i.e. have lower frequency and/or amplitude) by the buffer device and, possibly and additionally, by the gear pump.

For all of the above, it is deemed that the present solution has overcome a bias or in any case a natural orientation by the man skilled in the art (as emerges for example from the above-described documents, e.g. US 2011/0198009 and U.S. Pat. No. 8,226,868), which would have excluded any one use that interposed, between the extrusion head (functional for the shaping of the continuous strip) and the continuous mixer (functional for the mixing of the components for obtaining the sealing compound), a buffer device (e.g. a single-screw extruder) and a gear pump, the four devices being linked in series with structural continuity of the respective inner chambers.

In accordance with the first and/or with the second aspect, the present invention provides for the following preferred solutions.

Preferably the inner chambers of the continuous mixer, of the buffer device, of the gear pump, as well as the extrusion head lie on the same horizontal level.

Preferably the inner chambers of the continuous mixer and the buffer device are extended on axes that are transverse with respect to each other, more preferably mutually orthogonal axes.

Preferably the continuous mixer is of the type comprising at least two screws, co-rotating or counter-rotating, housed in the inner chamber.

In an alternative embodiment, the continuous mixer is of the type with planetary rollers (spindles).

In a further alternative embodiment, the continuous mixer is a ring extruder with multiple screws (e.g. ring extruder with six or more screws) or a kneader with oscillating screw Ko-Kneader® Buss® or a long continuous mixer (LCM).

Preferably the continuous mixer is a twin-screw mixer with co-rotating screws at least partially penetrating, more preferably with a diameter of the inner chamber greater than or equal to 18 mm and/or less than or equal to 420 mm.

Preferably the continuous mixer is structured so that the rotation velocity of the screws is greater than or equal to 100 rpm and/or less than or equal to 1200 rpm, more preferably with a torque greater than or equal to 20% and/or less than or equal to 90% with respect to the maximum torque. By maximum torque it is intended the ratio between the maximum nominal power and the maximum nominal velocity of rotation of the machine rotor or shaft (nominal data as provided by the manufacturer).

Preferably the buffer device has a diameter of the inner chamber greater than or equal to 40 mm and/or less than or equal to 750 mm.

Preferably the buffer device is structured so that the rotation velocity of the screw(s) is greater than or equal to 15 rpm and/or less than or equal to 100 rpm.

Preferably the gear pump has a diameter of the inner chamber greater than or equal to 20 mm and/or less than or equal to 180 mm.

Preferably the gear pump is structured so that the rotation velocity of the gears is greater than or equal to 10 rpm and/or less than or equal to 50 rpm.

Preferably the temperature of the sealing compound at the outlet of the extrusion head is greater than or equal to 60° C. and/or less than or equal to 160° C.

Preferably the flow rate of the sealing compound is greater than or equal to 30 kg/h and/or less than or equal to 5000 kg/h.

Preferably possible instantaneous flow rate pulses of the sealing compound inside the continuous mixer (e.g. coming from the continuous metering system and/or from the continuous mixer itself) are considerably limited and/or nearly eliminated in the buffer device. More preferably the buffer device reduces the amplitude and/or the frequency of the instantaneous flow rate pulses in its inner chamber respectively with respect to the amplitude and to the frequency of the pulses in the inner chamber of the continuous mixer. In such a manner, the buffer device is capable of continuously filling the chamber of the gear pump and with a flow rate that is at most slowly variable.

Preferably the continuous mixer and at least one first longitudinal portion of the inner chamber of the buffer device, proximal to the continuous mixer, are shaped in a manner such that the sealing compound, in the passage from the continuous mixer to said first proximal portion of inner chamber of the buffer device, undergoes a fall of pressure. Preferably the difference between the maximum value of the pressure of the sealing compound in a terminal longitudinal portion of the continuous mixer and the minimum value of the pressure of the sealing compound in said first proximal portion is positive or greater than or equal to 25% of said maximum value, more preferably greater than or equal to 40% of said maximum value, still more preferably greater than or equal to 60% of said maximum value. In one embodiment the fall of pressure is such to bring the pressure of the sealing compound substantially to the value of the ambient pressure. Preferably the free surface area of the orthogonal section of said first proximal inner chamber portion of the buffer device is greater than the free surface area of the orthogonal section of a terminal inner chamber portion of the continuous mixer proximal to the buffer device. Preferably the free surface area (to which a free space corresponds that is available for the compound) of the orthogonal section of said first proximal portion is greater than or equal to 110%, more preferably greater than or equal to 120%, of the free surface area of the orthogonal section of said terminal inner chamber portion of the continuous mixer.

According to the Applicant, the aforesaid decoupling between the operation of mixing and shaping of the semi-finished product has proven even more effective when the longitudinal portion of the inner chamber of the buffer device (e.g. single-screw extruder) proximal to the continuous mixer is shaped in a manner such that the sealing compound, in the passage from the continuous mixer to the proximal inner chamber portion of the buffer device, undergoes a fall of pressure.

Preferably the buffer device lowers the temperature of the sealing compound during its travel along its respective inner chamber, the difference between the temperature at the inlet and that at the outlet of the device being more preferably greater than or equal to 5° C., still more preferably greater than or equal to 10° C.

The sealing compound can for example comprise from 20 to 100 phr of at least one unsaturated styrene thermoplastic elastomer, from 0 to 80 phr of at least one synthetic or natural diene elastomer, from 20 to 200 phr, preferably from 30 to 150 phr, of at least one bonding resin, from 0.1 to 6 phr of at least one cross-linking agent.

Typically the sealing compound also comprises from 10 to 200 phr, preferably from 20 to 60 phr, of plasticising agent (e.g. oil or liquid polymer), and preferably from 1 to 40 phr, more preferably from 5 to 30 phr, of at least one reinforcement filler.

According to a preferred embodiment, the sealing compound can also comprise from about 1 phr to about 20 phr of at least one homogenising agent.

Preferably, the sealing compound can also comprise from 0.05 phr to 5 phr of at least one peptising agent.

With the term: 'phr' (acronym of "parts per hundred of rubbers") it is intended to indicate parts by weight per 100 parts by weight of total elastomeric base. For the calculation of 100 parts of total elastomeric base, possible additives are not considered (such as possible elastomeric resins or extension oils).

Preferably said strip has a profile, taken along the orthogonal section, having a first direction, conventionally termed horizontal direction, directed along the maximum size and a second direction conventionally termed height direction orthogonal to said horizontal direction.

Preferably said strip has a profile, taken along the orthogonal section, having two opposite greater sides (typically mutually parallel) with length much greater (e.g. at least five times greater, preferably at least ten times greater) than the mutual maximum distance. Preferably said profile is substantially trapezoid-like, said two sides coinciding with the greater and smaller bases of the trapezoid.

Preferably said maximum distance between the two greater sides is greater than or equal to 2 mm, preferably greater than or equal to 3 mm, and/or less than or equal to 6 mm, preferably less than or equal to 5 mm. Preferably said semi-finished product also comprises a service film for said sealing compound strip in order to allow the handling (e.g. the winding on drum via depositing, the transport, the deposition during building etc.) of the sealing compound. Preferably said service film adheres to one of said greater sides, more preferably at the greater base of said trapezoid. Preferably said service film is made of plastic, for example polyester (PET). Typically, during tyre production, the service film is separated from the strip before the deposition of the semi-finished product on the drum and it is recovered.

Preferably said semi-finished product also comprises a structural film adherent to said strip on the side opposite said service film, more preferably at a smaller base of said trapezoid. Preferably said structural film is self-supporting and can be made of thermoplastic material and/or elastomeric thermoplastic material and/or elastomeric material. For example, the structural film can be made of polyamide, e.g. nylon, or of polyester, e.g. PET. Preferably its thickness is lower than about 100 µm. Preferably said semi-finished product also comprises a first and a second elongated element (i.e. thin layers) made of an elastomeric compound, in partial adhesion to said strip on mutually opposite sides of said strip and at least partially arranged transverse to said greater sides, more preferably each elongated element being situated at a respective oblique side of said trapezoid. Preferably each elongated element made of elastomeric material has, on the orthogonal section, a first terminal portion arranged in contact with said structural film on the side opposite said strip of sealing material, a second terminal portion arranged in contact with said service film and an intermediate portion arranged in contact with said strip of sealing material.

Advantageously, the elongated elements made of an elastomeric material contain the sealing compound during the shaping of the tyre and the vulcanisation, when the pressure inside the mould presses the carcass against the inner walls of the mould itself.

The same elongated elements also prevent, during the shaping of the tyre, the structural film from being separated from the sealing compound strip at its terminal edges.

Preferably the apparatus comprises a conveyor device (e.g. a conveyor belt) placed downstream of the extrusion head in a manner so as to receive said strip and convey it away from the extrusion head.

Preferably the apparatus comprises a first reel on which a service film is wound (preferably the aforesaid service film), the first reel being adapted to continuously unwind said service film on the conveyor device in a manner such that said strip exiting from the extrusion head is abutted against said service film.

Preferably the apparatus comprises a second reel on which a structural film is wound (preferably the aforesaid structural film), the second reel being adapted to continuously unwind said structural film on the conveyor device in a manner such that said structural film adheres to said strip on the side opposite said service film, more preferably at a smaller base of said trapezoid. Preferably said structural film possesses mechanical properties such to allow supporting, without deformation, its weight and that of the strip of sealing material arranged thereon, during the transport of the semi-finished product, for example towards the building drum on which it must be applied. The strip of sealing material would in fact be deformed under its own weight if it was not supported on any support. Preferably the apparatus comprises a third and/or a fourth reel on each of which a respective elongated element is wound that is made of an elastomeric compound (preferably one respective elongated element) of the aforesaid elongated elements made of an elastomeric compound), the third and/or fourth reel being adapted to continuously unwind said elongated element made of an elastomeric compound on the conveyor device in a manner such that each of said elongated elements at least partially adheres to said strip on mutually opposite sides of said strip, more preferably each elongated element being situated at a respective oblique side of said trapezoid.

'Sealing complex' is defined as the complex, in the finished tyre, corresponding to the semi-finished product comprising at least said strip of sealing material and said structural film, preferably also comprising both said elongated elements made of elastomeric material.

Preferably the apparatus comprises a collection station placed downstream of the conveyor device and configured for winding said semi-finished product (preferably with said service film and/or said structural film and/or said elongated elements made of elastomeric material) on a collection reel.

Preferably the apparatus comprises cooling means adapted to cool said strip between the outlet of the extrusion head and the collection station. Further characteristics and advantages will be more evident from the detailed description of a preferred but not exclusive embodiment of a method and apparatus for continuously producing a semi-finished product comprising a sealing compound strip for producing tyres in accordance with the present invention.

Such description will be set forth hereinbelow with reference to the enclosed drawings, provided for exemplifying and hence non-limiting purposes, in which:

FIG. 1 schematically shows, in radial half-section, a self-sealing tyre for vehicle wheels;

Figure 1:
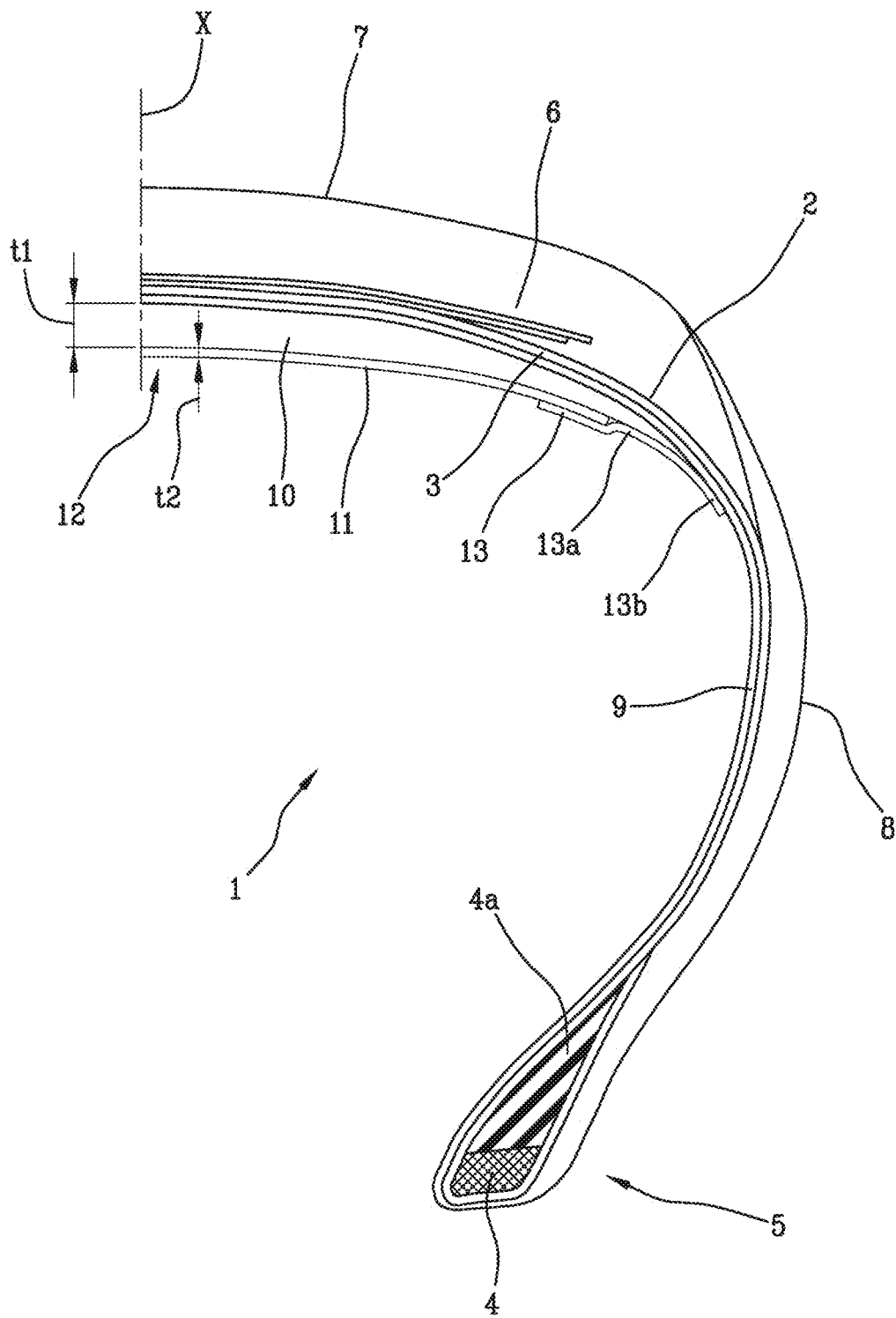

With reference number 1, a self-sealing tyre for vehicle wheels is indicated in FIG. 1; such self-sealing tyre generally comprises a carcass structure 2 comprising at least one carcass ply 3 having respectively opposite end flaps engaged with respective annular anchoring structures 4, possibly associated with elastomeric fillers 4a, integrated in the zones 5 normally identified with the name "beads". The carcass ply 3 comprises a plurality of textile or metallic reinforcement cords arranged parallel to each other and at least partially covered by a layer of elastomeric material.

The carcass structure 2 is associated with a belt structure 6 comprising one or more belt layers, situated in radial superimposition with respect to each other and with respect to the carcass ply 3, having typically metallic reinforcement cords.

In radially outer position with respect to the belt structure 6, a tread band 7 is applied that is made of an elastomeric compound, like other semi-finished products constituting the tyre 1.

Respective sidewalls 8 made of an elastomeric compound are also applied in axially outer position on the lateral surfaces of the carcass structure 2, each extended from one of the lateral edges of the tread band 7 up to the respective annular structure for anchoring to the beads 5.

In radially inner position with respect to the carcass 2, a layer of substantially air-impermeable elastomeric material or so-called liner 9 is also preferably provided.

In the embodiment illustrated in FIG. 1, the tyre 1 is of the type for automobiles; nevertheless, the present invention can also be applied to tyres of the type intended for heavy vehicles or motor vehicles.

The self-sealing tyre 1 also comprises a sealing compound layer 10 arranged at a crown zone of the tyre 1 and in radially inner position with respect to the liner 9. The sealing compound layer 10 is extended over the entire circumferential extension of the tyre 1. The sealing compound layer 10 has a maximum thickness "t1" substantially at the middle plane "X" of the finished tyre 1, i.e. moulded and vulcanised, and thins towards the axial ends of the crown zone (FIG. 1). Preferably, said maximum thickness "t1" is comprised between about 2.5 mm and about 6 mm.

The sealing compound 10 for example comprises from 20 phr to 100 phr of at least one unsaturated styrene thermoplastic elastomer, from 0 to 80 phr of at least one synthetic or natural diene elastomer, from 0.1 to 6 phr of at least one cross-linking agent, from 20 to 200 phr, preferably from 30 phr to 150 phr, of at least one bonding agent, from 10 phr to 200 phr, preferably from 20 phr to 60 phr of plasticising agent (oil or liquid polymer), and preferably from 1 to 40 phr, preferably from 5 to 30 phr, of at least one reinforcement filler. Preferably the sealing compound can also comprise from about 1 phr to about 20 phr of at least one homogenising agent. Preferably the sealing compound can also comprise from 0.05 phr to 5 phr of at least one peptising agent.

According to a preferred embodiment, the unsaturated styrene thermoplastic elastomer is a styrene polymer selected from among styrene/butadiene/styrene (SBS), styrene/isoprene/styrene (SIS), styrene/butadiene/isoprene/styrene (SBIS) block copolymers and mixtures thereof, also optionally comprising the corresponding diblock thermoplastic elastomers, such as styrene-butadiene (SB) and styrene-isoprene (SI). Particularly preferred are the styrene/isoprene/styrene block copolymers or mixtures of one or more unsaturated styrene thermoplastic elastomers containing at least 50% styrene/isoprene/styrene block copolymers. Particularly preferred are styrene/isoprene/styrene block copolymers with a content of styrene equal to or less than 20%, more preferably comprised between 14% and 20%.

Such copolymers are for example sold with the name of Europrene® SOL T190, T9133 by Polimeri Europa, Vector® 4113, 4114 by Dexco Polymers, Kraton® D1111, D1112 and D1107J by Kraton.

According to a preferred embodiment, the synthetic or natural elastomer included in the sealing compound can be selected from among those commonly used between the elastomeric materials that can be cross-linked with sulfur or peroxides, which are particularly adapted for tyre production, i.e. from the elastomeric polymers or copolymers with an unsaturated chain having a vitreous transition temperature (Tg) generally below 20° C., preferably in the range of 0° C. to −110° C. These polymers or copolymers can be of natural origin or they can be obtained by means of polymerisation in solution, polymerisation in emulsion or polymerisation in gaseous phase of one or more conjugated diolefins, optionally mixed with at least one comonomer selected from among monovinylarenes and/or polar comonomers in a quantity not greater than 60% by weight. The conjugated diolefins generally contain from 4 to 12, preferably from 4 to 8 carbon atoms and they can be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene, or mixtures thereof. 1,3-Butadiene or isoprene are particularly preferred. The polar comonomers that may be used can be selected, for example, from among: vinylpyridine, vinylquinoline, acrylic acid esters and alkyl acrylic acid esters, nitriles, or mixtures thereof, such as methyl acrylate, methyl methacrylate, ethyl methacrylate, acrylonitrile or mixtures thereof. Preferably, the synthetic or natural elastomer included in the sealing material can be selected, for example, from among: cis-1,4-polyisoprene (natural or synthetic rubber, preferably natural rubber), 3,4-polyisoprene, polybutadiene (in particular polybutadiene with a high 1,4-cis content), isoprene/isobutene copolymers that are possibly halogenated, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

The bonding agents advantageously used in the present invention can be selected in the group of hydrocarbon resins having an average numeric molecular weight comprised between several hundred and several thousand and which provides stickiness when the resin is mixed with natural or synthetic rubber.

As resins, various types of synthetic resins can be used. The aforesaid average numeric molecular weight (Mn) can be measured according to techniques known in the art, such as for example by gel permeation chromatography (GPC). In particular, as bonding agents the following can be used: hydrocarbon resins, phenol-based resins, carbon-based resins, xylene-based resins and natural resins such as resins with rosin base or terpene-based resins.

Examples of commercial hydrocarbon resin products comprise aromatic petroleum-based resins such as PETCOAL produced by Tosoh Co., Ltd.; C5/C9 hydrocarbon-based resins such as PETROTACK produced by Tosoh Co.; C5 hydrocarbon-based resins such as Escorez® 1102 (produced by ExxonMobil).

Examples of phenol-based resins comprise resins with alkylphenol-formaldehyde base, and derived resins modified with rosin, resins with alkylphenol-acetylene base, alkylphenol and terpene-phenol modified resins. Specific examples indicated by trademark comprise commercial products such as RESIN SP-1068 (produced by SI GROUP Inc.) which is a octylphenol-formaldehyde resin, and KORESIN (produced by BASF Company) which is a p-t-butylphenol-acetylene resin.

Examples of carbon-based resins include coumarone-indene resins. Specific examples comprise commercial products, mentioned by trademark, such as NOVARES C resins (produced by RUTGERS CHEMICAL GmbH) which are synthetic coumarone-indene resins (such as NOVARES C10, C30, and C70).

Examples of natural resins are the rosin resins and the terpene resins, which can be used as they are or modified: examples of these classes are the DERCOLYTE terpene resins produced by DRT, the resins derived from rosin acids DERTOLINE, GRANOLITE and HYDROGRAL produced by DRT.

Examples of xylene-based resins comprise the xylene-formaldehyde resins.

The aforesaid bonding agents can be used on their own or mixed together. Suitable cross-linking agents are sulfur or molecules containing sulfur, in the presence of compounds containing zinc and fatty acids, or peroxides. Specific examples of molecules containing sulfur usable as cross-linking agents in the sealing materials for the obtainment of self-sealing tyres are elementary sulfur, thiurams, such as tetraisobutyl thiuram disulfide or tetrabenzyl thiuram disulfide), or dithiophosphates, such as zinc dibutyldithiophosphate, or dithiocarbamates, such as zinc dimethyl dithiocarbamate, together with ZnO or compounds containing zinc, fatty acids and sulfenamides, such as N-tert-butyl-2-benzothiazyl sulfenamide (TBBS) or N-cyclohexyl-2-benzothiazyl sulfenamide (CBS), or thiazoles, such as 2,2'-dithiobis-(benzothiazole) (MBTS).

Specific examples of peroxides usable as cross-linking agents in the sealing materials for the obtainment of self-sealing tyres are organic peroxides such as dicumyl peroxide (DCP), 2,5-dimethyl-2,5-di(tert-butyl-peroxy)hexane (DBPH), bis-(2,4-dichlorobenzoyl) peroxide (DCBP), di-tert-butyl-peroxide.

Preferably a peroxide, still more preferably 2,5-dimethyl-2,5-di(tert-butyl-peroxy)hexane (DBPH) is used as cross-linking agent.

A specific example of usable DBPH is a mixture of 45% DBPH with calcium carbonate and silica sold with the name Luperox 101 XL45 by Arkema.

The quantity of peroxide is preferably comprised between about 0.1 phr and about 6 phr.

The presence of peroxide or sulfur or another cross-linking agent allows the partial chemical cross-linking of the sealing composition during the vulcanisation of the tyre in a manner so as to improve the chemical sealing characteristics of the sealing material layer.

At least one reinforcement filler can be advantageously added to the abovementioned cross-linkable elastomeric composition, in a quantity generally from 0 phr to 120 phr, preferably from 20 phr to 90 phr. The reinforcement filler can be selected from among those commonly used for cross-linked products, in particular for tyres, such as carbon black, silica, aluminium, aluminosilicates, calcium carbonate, kaolin or mixtures thereof. Carbon black, silica and mixtures thereof are particularly preferred. According to a preferred embodiment, said carbon black reinforcement filler can be selected from among those which have a surface area not less than 20 m2/g (determined by STSA—statistical thickness surface area—according to ISO 18852:2005).

In radially inner position with respect to the sealing compound layer 10 and in direct contact with said sealing compound 10 layer, a structural film 11 is arranged which can be made of thermoplastic polymer and/or thermoplastic-elastomeric polymer and/or elastomeric polymer.

With thermoplastic polymer it is intended a polymer comprising linear chains or chains with few branches, not bonded with each other (i.e. not cross-linked): it is sufficient to increase the temperature in order to bring such polymer to a viscous state.

The Thermoplastic Elastomers (TPE), or thermoplastic rubbers, are a class of copolymers or a polymer mixture (usually one plastic and one rubber) with both thermoplastic and elastomeric properties. While most elastomers are thermosetting, the TPEs are instead relatively easy to use in the production, for example, through injection moulding. The thermoplastic elastomers show the advantages typical both of plastics and rubbers. The main difference between the thermosetting elastomers and the thermoplastic elastomers is the type of cross-linking of their structures. Indeed, the cross-linking is an essential structural factor that contributes to conferring high elastic properties.

The structural film 11 is self-supporting, and can be made of an elastomeric thermoplastic material by means of a block copolymer such as a thermoplastic polyurethane and/or made of polyamide and/or made of polyester. The self-supporting film 11 is extended, like the sealing compound layer 10, for the entire circumferential extension of the tyre 1 and has a width, i.e. a transverse extension, slightly less than the transverse extension of said layer 10.

Preferably, before shaping, said self-supporting film 11 made of elastomeric thermoplastic has a thickness "t2" comprised between about 10 μm and about 100 μm.

The structural film 11 can be thermoplastic, made of polyamide or polyester. Preferably, said self-supporting thermoplastic film, before shaping, has a thickness less than 50 μm.

Preferably, said self-supporting thermoplastic film, before shaping, has a thickness comprised between about 10 μm and about 30 μm.

Preferably, in the finished tyre, the structural films have thicknesses ranging from 10% to 40% less than the thickness measured before shaping.

Preferably, in the finished tyre, said self-supporting film has a puncture strength less than about 30N.

The sealing compound layer 10 and the self-supporting film 11 form a sealing complex 12. The sealing complex 12, when a sharp-pointed element (such as a nail) penetrates into the tyre and traverses the sealing compound layer 10 and the self-supporting film 11, is able to adhere to the object inserted therein and can also flow inside the hole when such object is removed, in such a manner sealing the hole itself and preventing the outflow of air from the tyre. The sealing complex 12 can be easily perforated by the sharp-pointed element while maintaining a deformability and a stickiness such to contribute to the transfer of the sealing compound during the expulsion of the sharp-pointed element. The tyre 1 also preferably comprises two elongated elements made of elastomeric material 13, each arranged at a circumferential edge of the sealing complex 12. An axially inner portion 13a of each elongated element made of elastomeric material 13 is partially superimposed on the sealing complex 12 and is arranged in radially inner position with respect to said sealing complex 12. An axially outer portion 13b of each elongated element made of elastomeric material 13 lies in direct contact with the liner 9. By axially inner portion 13a, it is intended a portion closer to a middle plane "X" of the tyre 1 with respect to the axially outer portion 13b.

More in detail, the axially inner portion 13a in turn has an axially inner zone applied directly on the structural film 11 and an axially outer zone applied directly on one surface of the sealing compound layer 10. Indeed, the sealing compound layer 10 has an axial extension greater than the axial extension of the structural film 11. It follows that each elongated element made of elastomeric material 13 is in direct contact both with the sealing compound layer 10 and with the structural film 11.

The building of a green precursor of a tyre 1 as described above, comprising the sealing complex 12, is preferably actuated by means of assembly of respective semi-finished products on one or more forming supports, not illustrated.

The carcass structure and the belt structure are generally made separately from each other in respective work stations, in order to be mutually assembled at a later time.

The sealing complex 12 corresponds to a semi-finished product 50, its precursor in the green tyre.

Figure 2:
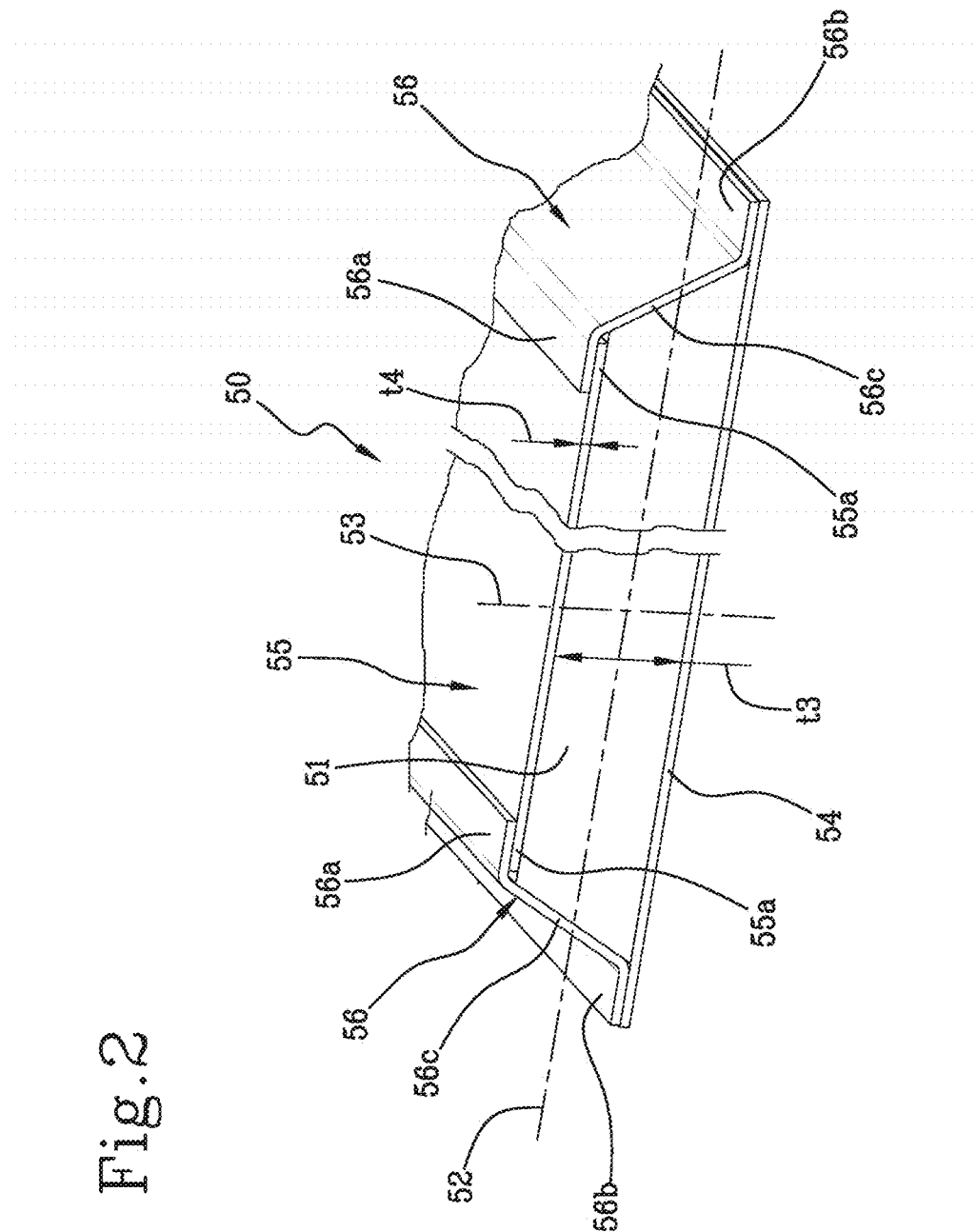
FIG. 2 shows a partial perspective view of a semi-finished product comprising two elongated elements made of elastomeric material and intended to form part of the self-sealing tyre of FIG. 1.

The semi-finished product 50, as an example partially shown in FIG. 2, comprises a sealing compound strip 51 (precursor of the sealing compound 10) having a profile (shown in FIG. 2 in perspective view) taken along the orthogonal section, having a first horizontal direction 52, directed along the maximum size, and a second height direction 53, orthogonal to the horizontal direction. As an example, such profile has trapezoid shape.

Preferably the semi-finished product also comprises a service film 54 in order to allow the handling of the sealing compound 51 and which is removed before the application of the semi-finished product on the building drum. Preferably the service film adheres to the larger base of the trapezoid. Preferably the semi-finished product 50 also comprises a structural film 55 (precursor of the aforesaid structural film 11) adherent to the continuous strip 51 on the side opposite the service film 54, at the smaller base of the trapezoid.

Preferably the semi-finished product 50 also comprises a first and a second elongated element 56 made of an elastomeric compound (precursors of the aforesaid elongated elements 13), in partial adhesion to the continuous strip 51 on mutually opposite sides of the continuous strip. Preferably each elongated element has, on the orthogonal section, a first terminal portion 56a arranged in contact with the structural film 55 on the side opposite the strip di sealing material, a second terminal portion 56b arranged in contact with the service film 54 and an intermediate portion 56c arranged in contact with the sealing material strip (at the oblique sides).

The strip of sealing material 51 has a thickness "t3" along said height comprised between about 2.5 mm and about 6 mm.

The structural film 55 before the incorporation of the semi-finished product 50 in the precursor of the tyre 1 and the shaping of the same has a thickness "t4" less than 50 μm and preferably comprised between about 10 μm and about 30 μm.

The obtainment of the carcass structure first provides for the continuous production of the semi-finished product 50 in accordance with the present invention, which is subsequently orthogonally cut into sections of suitable length and wound around a radially outer surface of a building drum, maintaining the structural film 55 in radially more internal position. Opposite end flaps of the semi-finished product 50 are mutually joined by means of an adhesive type, for example.

The liner 9 and carcass ply or plies 3 are applied on the semi-finished product 50 to form a so-called "carcass sleeve", typically substantially cylindrical. The annular structures 4 for anchoring to the beads 5 are fit or formed on the opposite end flaps of the carcass ply or plies 3, which are subsequently turned up around the annular structures 4 themselves in a manner so as to enclose them in a kind of noose.

On a second drum or auxiliary drum, a so-called "external sleeve" is obtained comprising the belt layers 6 applied in mutual radial superimposition, and possibly the tread band 7 applied in radially outer position with respect to the belt layers 6. The external sleeve is then drawn by the auxiliary drum in order to be coupled to the carcass sleeve. For such purpose, the external sleeve is arranged coaxially around the carcass sleeve, after which the carcass ply or plies 3 are shaped according to a toroidal configuration by means of mutual axial approaching of the beads 5 and simultaneous insertion of pressurised fluid inside the carcass sleeve, in a manner so as to determine a radial expansion of the carcass plies 3 until they are made to adhere against the inner surface of the external sleeve.

Following the building of the green tyre 1, a moulding and vulcanisation treatment is executed, aimed to cause the structural stabilisation of the tyre 1 by means of cross-linking of the elastomeric compounds as well as impart on the tread band 7 a desired tread pattern and to impart at the sidewalls 8 possible indicia. After vulcanisation, the sealing compound layer 10 has the desired characteristics of deformability and stickiness (which can already be possessed by the sealing material strip 51).

Figure 3A:
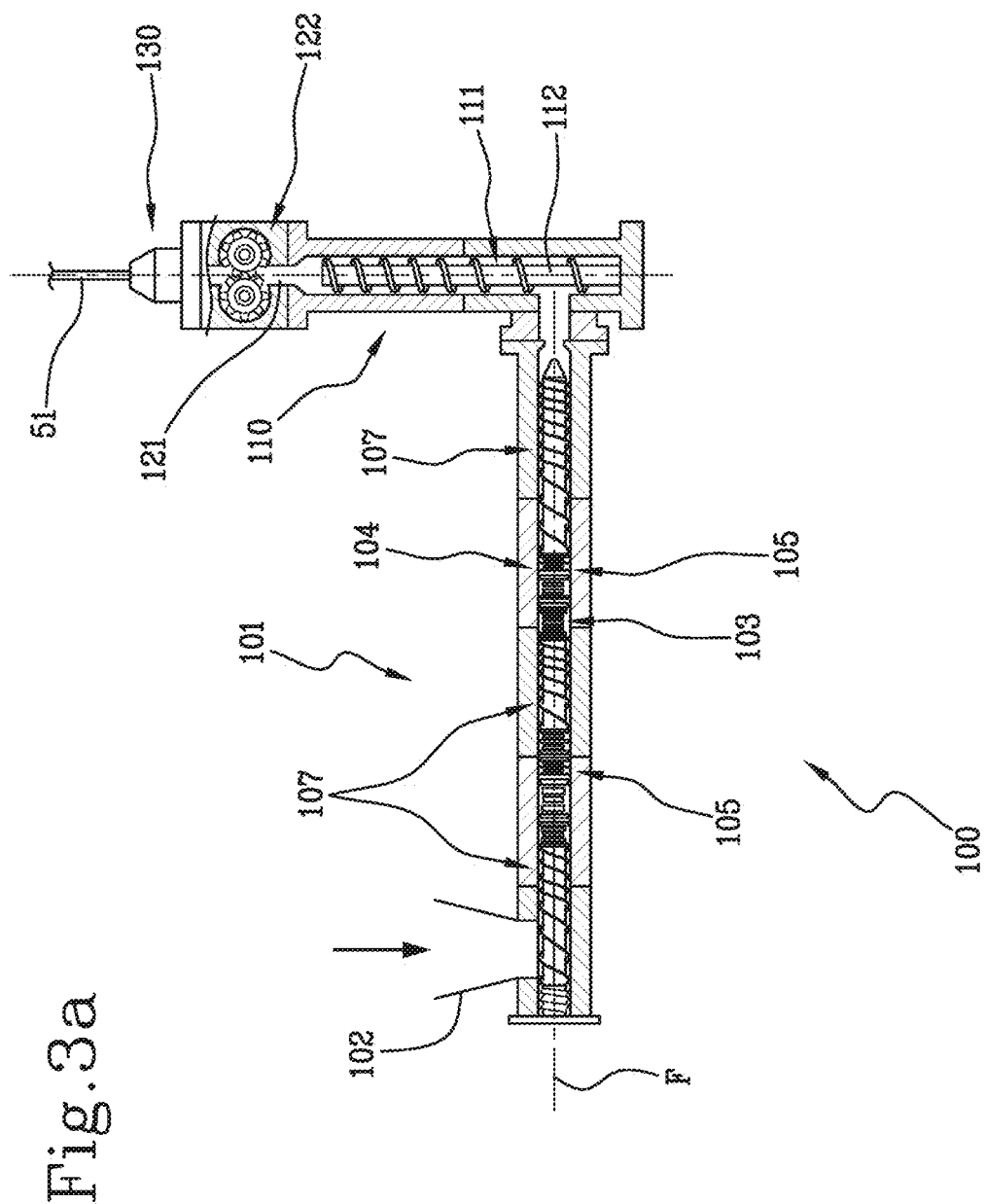
FIG. 3a shows a schematic plan view, partially by functional units and partially in cross section, of a first portion of an apparatus according to the present invention.
Figure 3B:
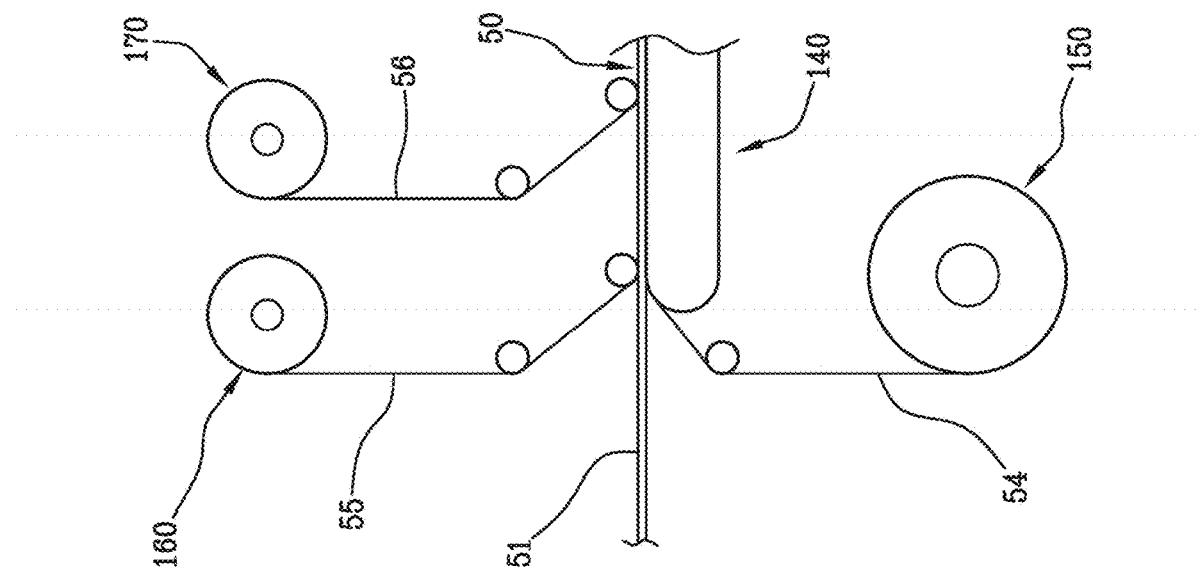
FIG. 3b shows a lateral schematic view, partially by functional units, of a second portion of an apparatus according to the present invention.

FIGS. 3a and 3b schematically show an apparatus 100 embodiment for producing a semi-finished product 50 comprising a sealing compound strip 51.

The apparatus 100 comprises a continuous mixer 101 structured for receiving the components of the sealing compound and to continuously mix them until the sealing compound is obtained. Schematically indicated in FIG. 3a is a hopper 102 at one end of the mixer for feeding the components of the sealing compound. However, the mixer can comprise (and typically comprises) more than one feed mouth or hopper, for example distributed along the main extension direction F (which defines the direction of flow of the compound being processed). As an example, the continuous mixer comprises at least one feed mouth at the upstream end of the mixer for the masterbatch (i.e. a premixed compound, comprising for example at least the unsaturated styrene thermoplastic elastomer, but still lacking some components), and, more downstream (not shown), a feed mouth for the bonding resin, one or more feed mouths for the plasticising agent ('oil') and a feed mouth for the cross-linking agent. The feeding of the components to the continuous mixer typically occurs by means of a continuous metering system (not shown), arranged upstream of the plant 100 itself.

The continuous mixer 101 comprises at least one inner chamber 103 within which at least one worm screw 104 rotates, for example, or a plurality of screws rotates. The mixing of the material occurs during its travel along the major extension direction F of the inner chamber 103. The continuous mixer is mainly provided with mixing portions 105 capable of conferring high shear stress to the compound, and with possible redistribution portions. The continuous mixer is also provided with conveyor portions 107 for conveying the material being processed from one longitudinal end to the other of the inner chamber.

In one embodiment example, the continuous mixer is a co-rotating twin-screw mixing extruder Maris™ TM58HT, having diameter (D) 58 mm and ratio between length (L) and diameter (D) equal to L/D=56.

The apparatus 100 comprises, downstream of the continuous mixer 101, a buffer device 110 and, downstream of the buffer device, a gear pump 120, both provided with a respective inner chamber 111 and 121.

The buffer device is arranged and structured for receiving the sealing compound from the continuous mixer and for feeding the gear pump (at the same time absorbing possible flow rate pulses of the compound coming from the continuous mixer). The buffer device is preferably coupled in series, with structural continuity, to the continuous mixer in a manner such that the two respective inner chambers 103 and 111 are physically connected without interruption. For example, the buffer device 110 is directly flanged to the continuous mixer 101, as is shown as an example in FIG. 3a.

Preferably the buffer device is a single-screw extruder, such as for example with Maris™ trademark having diameter (D) equal to 70 mm and ratio between length (L) and diameter (D) equal to L/D=10.

The single-screw extruder comprises a helical single conveyor screw 112 housed in the respective inner chamber 111 and configured for pushing the material along the flow direction F, exerting thereon a substantially zero or very low mixing.

The gear pump 120 (e.g. Maag™ having internal diameter of the chamber equal to 50 mm) has a gear system 122 housed in the respective inner chamber 122, and is coupled with structural continuity to the buffer device 110 downstream of the latter, in a manner such that the two respective inner chambers are physically connected without interruption. For example, the gear pump 120 is directly flanged to the buffer device 110, as is shown as an example in FIG. 3a.

The apparatus 100 also comprises an extrusion head 130 coupled directly and with structural continuity to the gear pump 120, downstream of the latter, in a manner such to receive in input the sealing compound from the gear pump and deliver in output the sealing compound in the form of said strip 51 with predetermined transverse size. As an example, the extrusion head is a flat thermostated head with output section 200 mm×5 mm.

The apparatus 100 preferably comprises a conveyor device 140 (e.g. a conveyor belt) placed downstream of the extrusion head in a manner so as to receive the strip 51 therefrom and convey it away from the extrusion head, as is shown as an example in FIG. 3b.

Preferably the apparatus comprises a first reel 150 on which the service film 54 is wound for its continuous unwinding on the conveyor device in a manner such that the strip 51 in output from the extrusion head is abutted against the service film 54.

Preferably the apparatus comprises a second reel 160 on which the structural film 55 is wound for its continuous unwinding on the conveyor device in a manner such that the structural film adheres to the strip 51 on the side opposite the service film 54.

Preferably the apparatus 100 comprises a third and/or a fourth reel 170 (only one reel is shown in FIG. 3), on each of which a respective elongated element is wound made of an elastomeric compound 56 for their continuous unwinding on the conveyor device 140 in a manner such that each elongated element at least partially adheres to the strip 51 on mutually opposite sides thereof.

The apparatus 100 can also comprise a cooling station (not shown) arranged downstream of the conveyor device 140. The cooling station can be a further conveyor belt or a further section of the conveyor belt of the conveyor device, at which suitable fans are arranged for air cooling.

The apparatus 100 can comprise a series of drums (not shown) arranged downstream of the cooling station for the festoon arrangement of the semi-finished product 50, in order to create a buffer for the semi-finished product 50.

Preferably the apparatus 100 comprises a collection station (not shown) arranged downstream of the cooling station and/or of the series of drums, configured for winding the semi-finished product on suitable collection reels possibly together with a service belt.

During use, the apparatus 100 implements the aforesaid method for producing the semi-finished product 50 comprising the sealing compound strip 51 for building tyres.

The method comprises: feeding the components of the sealing compound into the continuous mixer 101, and mixing the components while they advance in the continuous mixer until the sealing compound is obtained (having the desired uniformity and characteristics of the present invention); continuously feeding the sealing compound from the continuous mixer directly to the buffer device 110; advancing the sealing compound into the buffer device in a manner so as to continuously feed the sealing compound to the gear pump 120; continuously feeding, by means of the gear pump, the sealing compound to the extrusion head 130, in a manner so as to obtain in output therefrom the sealing compound strip 51 with predetermined transverse size.

As an example, by using the devices indicated as an example above, the method provides for a flow rate of the sealing compound equal to 150 kg/h. The work conditions of the continuous twin-screw mixer 101 (TSE) are the following: rotation velocity of the screws 300 rpm, torque 35%, pressure equal to 10 bar. The work conditions of the single-screw extruder 110 are the following: rotation velocity of the screws 50 rpm, torque 10%, pressure 10 bar. The work conditions of the gear pump 120 are the following: rotation velocity of the screws 25 rpm, torque 15%, pressure at the output 50 bar. The temperature of the compound at the outlet of the extrusion head is equal to 110° C.

The extruded strip 51 is received by the belt 140 and is inserted between the two films 54 and 55 at its lower and upper surfaces and delimited at the sides by the two elongated elements 56 that have the function of sealing the flaps. The semi-finished product 50 then advances to the cooling station where it is cooled in a manner such that it is hardened and becomes suitable for storage and use in building the tyre 1. For the purpose of the cooling, the semi-finished product is festooned on the series of drums, which have the function of continuing to collect the incoming semi-finished product from the line during the reel change in the collection station. Finally, the semi-finished product 50 reaches the collection station where it is wound on the collection reels together with a service belt.

Figure 4:
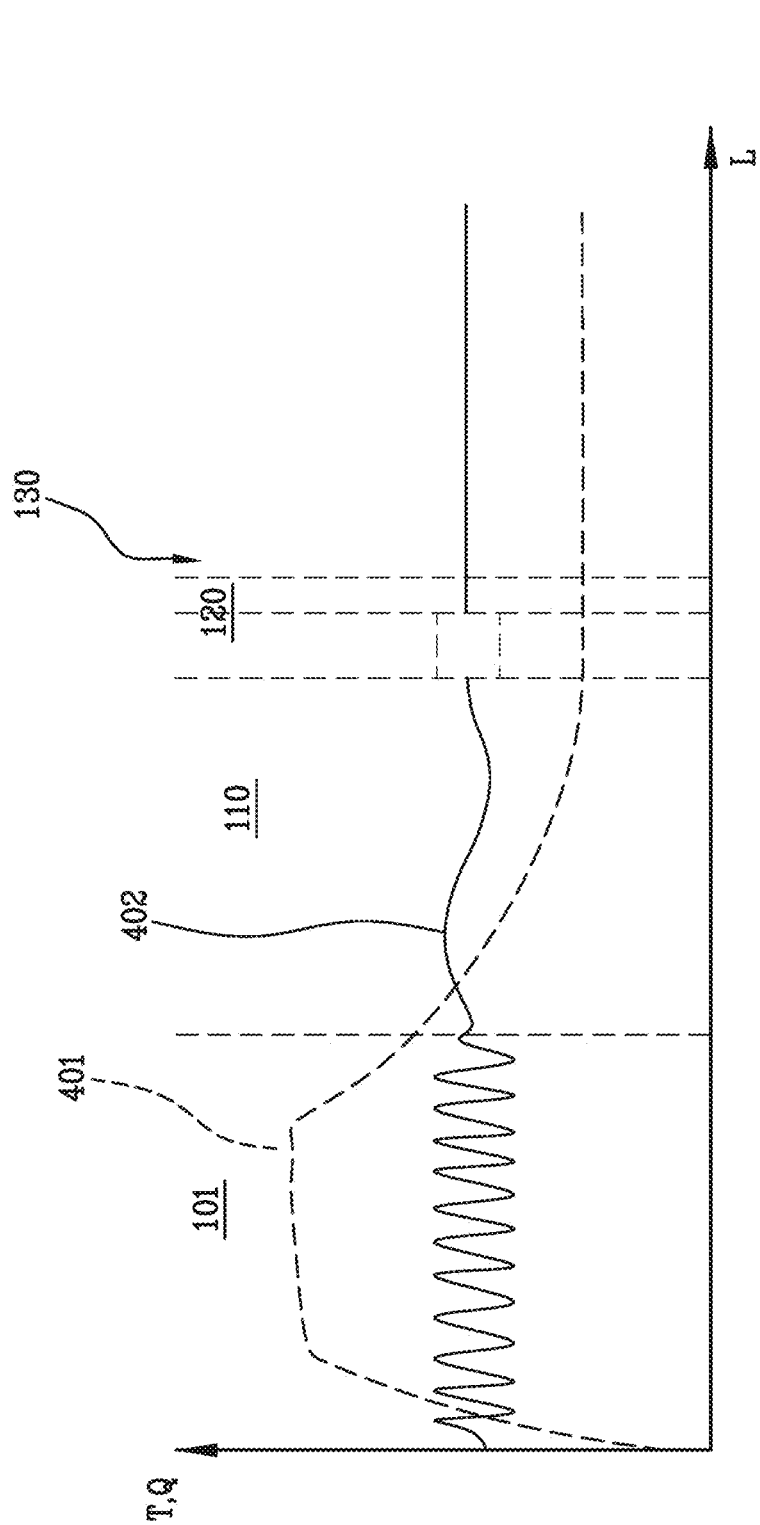
FIG. 4 shows, in a qualitative manner and with arbitrary scales, the profiles of temperature and flow rate along an apparatus according to the present invention.

FIG. 4 shows, in qualitative form and with arbitrary scales, the progression of the temperature T (dashed line 401) of the sealing compound and the progression of the instantaneous flow rate Q (solid line 402) of sealing compound along the apparatus 100. The horizontal axis represents, in arbitrary scale, the position L along the apparatus 100. Indicated in brief in the graph are the sections of the apparatus 100 corresponding to the various devices constituting the same, by means of the use of the corresponding reference numbers. By instantaneous flow rate it is intended the flow rate of compound through the section of the apparatus at an arbitrary instant.

As can be observed from FIG. 4, the buffer device 110 in accordance with the present invention carries out the function of controlling the temperature of the compound, and hence its viscosity, through a cooling profile. In addition, it effectively absorbs the flow rate pulses (in terms of instantaneous frequency and/or amplitude) typically introduced by the mixer (which, if they reached the gear pump and/or the extrusion head, would cause a corresponding pulsing of the transverse size). In such a manner, the buffer device is capable of continuously filling the chamber of the gear pump and with a flow rate that is at most slowly variable.

The gear pump 120, for its part, receives the material from the buffer device and ensures the volumetric stability and the thermal control of the material for the correct feeding of the extrusion head, also absorbing the possible slow flow rate pulse transmitted by the buffer device.

The result is a sealing compound strip 51 with the geometric characteristics sufficiently precise and stable for being used directly in a semi-finished product 50 (i.e. with requiring further shaping processing).

As reported above, before arriving at the method and apparatus according to the present invention, the Applicant implemented a first comparative arrangement in which the flat thermostated extrusion head with output section 200 mm×5 mm was coupled directly, with structural continuity, to the outlet of a co-rotating twin-screw mixing extruder Maris™ TM58HT, having diameter (D) 58 mm and ratio between length (L) and diameter (D) equal to L/D=56, and a second comparative arrangement in which the aforesaid extrusion head was coupled directly, with structural continuity, to a gear pump Maag™ with internal diameter equal to 50 mm, which in turn was coupled directly, with structural continuity, to the outlet of the aforesaid continuous twin-screw mixer.

With respect to the aforesaid first and second comparative arrangement, the Applicant has found significant improvements in the sealing material strip produced by one embodiment example of the present invention, in which a single-screw extruder Maris™ having diameter (D) equal to 70 mm and ratio between length (L) and diameter (D) equal to L/D=10 was introduced in the second comparative arrangement, interposed with structural continuity between the aforesaid continuous twin-screw mixer and the aforesaid gear pump.

In particular the Applicant has empirically established that the variance (intended as the interval of maximum variability) of each transverse size of the sealing compound strip produced according to the aforesaid embodiment of the present invention resulted, given the same flow rate, about a third of the variance introduced by the first arrangement and about half the variance introduced by the second arrangement.

In addition, the Applicant has empirically established that the temperature of the sealing compound at the outlet of the extrusion head in the aforesaid embodiment of the present invention resulted, given the same flow rate, about 20° C. lower than the output temperature in the first arrangement and about 10° C. lower than the output temperature in the second arrangement.

The invention claimed is:

1. A method for producing a semi-finished product comprising a strip of sealing compound for building tyres, the sealing compound comprising at least the following components:
   (a) at least one unsaturated styrene thermoplastic elastomer;
   (b) at least one bonding resin;
   (c) at least one cross-linking agent;
the method comprising:
   feeding the components of the sealing compound in a continuous mixer comprising an inner chamber, and mixing the components while they advance in the continuous mixer until the sealing compound is obtained;
   subsequently continuously feeding the sealing compound from the continuous mixer directly to a buffer device having a respective inner chamber and coupled in series with structural continuity to the continuous mixer, downstream of the latter, in a manner such that the two respective inner chambers are physically connected without interruption;
   subsequently advancing the sealing compound along the buffer device, absorbing possible flow rate pulses of the sealing compound coming from the continuous mixer, in a manner so as to continuously feed the sealing compound to a gear pump having a respective inner chamber and a gear system housed in the respective inner chamber, and coupled with structural continuity to the buffer device downstream of the latter, in a manner such that the two respective inner chambers are physically connected without interruption; and
   subsequently continuously feeding, by means of the gear pump, the sealing compound to an extrusion head coupled directly and with structural continuity to the gear pump, in a manner so as to obtain, in output from said extrusion head, said strip of sealing compound with predetermined transverse size.

2. The method as claimed in claim 1, wherein a temperature of the sealing compound at an outlet of the extrusion head is greater than or equal to 60° C. and/or less than or equal to 160° C. and wherein a flow rate of the sealing compound is greater than or equal to 30 kg/h and/or less than or equal to 5000 kg/h.

3. The method as claimed in claim 1, wherein the sealing compound further comprises at least one diene elastomer and/or at least one plasticising agent and/or at least one reinforcement filler and/or at least one peptising agent.

4. The method as claimed in claim 1, wherein the sealing compound comprises from 20 to 100 phr of at least one unsaturated styrene thermoplastic elastomer, from 0 to 80 phr of at least one synthetic or natural diene elastomer, from 20 to 200 phr, preferably from 30 to 150 phr, of at least one bonding resin, from 0.1 to 6 phr of at least one cross-linking agent.

5. The method as claimed in claim 1, wherein the buffer device reduces the amplitude and/or the frequency of the instantaneous flow rate pulses in its inner chamber with respect to the amplitude and/or frequency of the pulses in the inner chamber of the continuous mixer.

6. The method as claimed in claim 1, wherein the sealing compound, in a passage from the continuous mixer to a first portion of the inner chamber of the buffer device, proximal to the continuous mixer, undergoes a fall of pressure.

7. The method as claimed in claim 1, wherein the buffer device lower a temperature of the sealing compound during its travel along its respective inner chamber, the difference between the temperature at an inlet and that at an outlet of the buffer device being greater than or equal to 5° C.

8. The method as claimed in claim 1,
   wherein said strip has a profile, taken along an orthogonal section, having two opposite greater sides with length greater than a mutual maximum distance,
   wherein the method further comprises:
   conveying said strip away from the extrusion head,
   continuously unwinding a service film in a manner such that said strip exiting from the extrusion head is abutted against said service film,
   continuously unwinding a structural film in a manner such that said structural film adheres to said strip, and
   continuously unwinding a first and a second elongated elements made of an elastomeric compound in a manner such that said elongated elements at least partially adhere to said strip, thereby producing the semi-finished product that further comprises:
   the service film adherent to one of said greater sides,
   the structural film adherent to said strip on a side opposite said service film, and
   the first and the second elongated elements made of the elastomeric compound, in partial adhesion to said strip on mutually opposite sides of said strip and at least partially arranged transverse to said greater sides.

9. A process for producing self-sealing tyres, comprising:
building, vulcanising and moulding green tyres,
wherein the building of the green tyres includes producing a semi-finished product comprising a strip of sealing compound in accordance with the method as claimed in claim 1.

* * * * *